Figure 1:
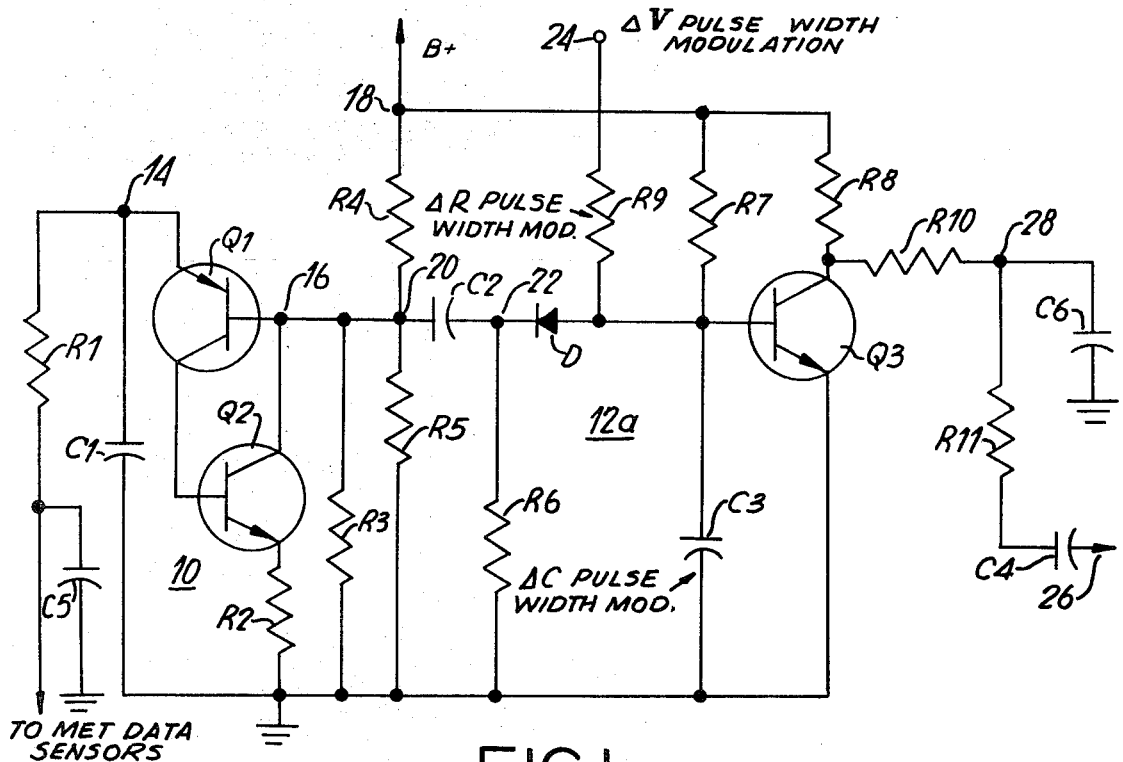

United States Patent [19]
Poppe, Jr. et al.

[11] 3,781,715
[45] Dec. 25, 1973

[54] RADIOSONDE METEOROLOGICAL DATA OSCILLATOR AND PULSE STRETCHER

[75] Inventors: Martin C. Poppe, Jr., Stony Brook, N.Y.; Maurice Friedman, Philadelphia, Pa.

[73] Assignee: Beukers Laboratories, Inc., Hauppauge, N.Y.

[22] Filed: Sept. 2, 1970

[21] Appl. No.: 68,990

[52] U.S. Cl................. 332/9 T, 307/265, 328/58, 332/14, 343/6.8 R
[51] Int. Cl.............................................. H03k 7/08
[58] Field of Search.............. 332/9, 9 T, 10, 14; 307/265, 266, 267; 328/58; 179/15 BM, 15 BT, 15 BY; 325/39, 40, 139, 142, 34; 343/6.8, 6.8 LC

[56] References Cited
UNITED STATES PATENTS

| | | | |
|---|---|---|---|
| 2,583,484 | 1/1952 | Guanella et al. | 179/15 BM |
| 3,525,861 | 8/1970 | Alexander | 332/9 R |
| 3,144,620 | 8/1964 | Raillard | 332/9 T X |
| 3,185,940 | 5/1965 | Abbott et al. | 332/9 T X |
| 3,350,637 | 10/1967 | Pochtar | 332/9 T X |
| 3,191,071 | 6/1965 | King et al. | 328/58 X |

*Primary Examiner*—Alfred L. Brody
*Attorney*—Sandoe, Hopgood and Calimafde

[57] ABSTRACT

A meteorological data signal generator comprises a variable frequency pulse oscillator having an output rate proportional to the level of a sensed meteorological parameter, e.g. temperature. A pulse stretcher is coupled to the output of the pulse oscillator to expand the pulse and lower the high frequency harmonic content of the output pulses. The extent of pulse stretching is variable, and if desired, may be controlled by a second sensed meteorological parameter, whereby a single output pulse train is modulated in response to two distinct parameters.

8 Claims, 2 Drawing Figures

INVENTORS
MARTIN C. POPPE
MAURICE FRIEDMAN

RADIOSONDE METEOROLOGICAL DATA OSCILLATOR AND PULSE STRETCHER

The present invention relates generally to data generating circuits, and more particularly to a data generator for use in a remote meteorological data sensor and transmitting system such as that carried aloft in a balloon or the like.

As the acquisition of accurate knowledge of meteorologic conditions in the upper atmosphere has become increasingly important, devices have been developed to satisfy these requirements. As a result of the availability of this data, meteorologists are better able to make their predictions of future weather conditions.

One such atmospheric meteorological sensing and telemetering system is described in a co-pending application Ser. No. 873,590 filed Nov. Meteorological 3, 1969 entitled Navigation Tracking System for a Neteorogloical Telemetry System, and assigned to the assignee of the present application. The system disclosed in said application includes a radiosonde carried aloft into the atmosphere by means of a balloon.

The radiosonde includes a number of meteorological parameter sensors which are generally of the type having an electrical parameter, e.g., resistance, which is proportional to the sensed meteorological parameters, e.g., temperature. The sensor is connected as part of a meteorological data generator which produces a signal utilized to modulate a carrier signal. The thus modulated carrier is thereafter transmitted by a suitable antenna carried by the radiosonde, such as that disclosed in said co-pending application, and received and processed at a remote, ground-based weather tracking station.

For the information transmitted by the weather radiosonde to be most meaningful, the balloon position must also be known and correlated to the transmitted meteorological data. To this end, as also disclosed in said co-pending application, the radiosonde may further include a navigation receiver to receive and process navigation tracking signals e.g., Loran-C or Omega signals from a ground station to modulate the carrier that is modulated by the meteorological data signal. The combined data and navigation signals are in this manner transmitted on the common carrier from the radiosonde and, as noted above, received and processed at the tracking station to provide the desired weather information.

There are, however, several areas of difficulty and inefficiency that are encountered in the presently employed meteorological telemetry systems. In these systems, data is commonly transmitted from the radiosonde in the form of a modulated train of pulses. The pulses may be, for example, at a rate or amplitude proportional to the sensed meteorological parameter, or they may be spaced by an amount proportional to that sensed parameter.

These meteorological data pulses, which may be produced by circuits such as a blocking oscillator, are of relatively short duration and have relatively high rise and fall times. As a result these pulses contain considerable harmonic content, and thus have much of their energy located in the high end of the frequency spectrum. Unfortunately, the frequency of the navigation, e.g., Loran-C or Omega, signals also lies primarily in the high frequency end of the spectrum.

As a result of the possible frequency overlap between the data and navigation signals that are transmitted on a common carrier, there is the likelihood of the occurrence of harmful interference between these signals, which in turn may introduce significant errors in either or both data signals, and would thus seriously affect the accuracy of the received meteorological and location information. This is clearly an intolerable situation, particularly in an application in which accuracy of the data is a primary goal.

Moreover, in the known meteorological telemetry systems a low-pass filter is provided at the receiver in an attempt to reduce the mount of telemetry noise. However, since the data pulses in the known systems contain considerable high frequency components, the band-pass of these filters must be sufficiently wide to pass the data signal. Unfortunately and unavoidably, the requirement for the wide pass band results in the reception of the noise at those frequencies within the pass band.

In addition, it is highly preferable for the sake of economy and efficiency to obtain information on a number of meteorological parameters in addition to temperature, such as humidity, pressure and the like, with the use of a minimum amount of circuitry associated with the individual parameter sensors. Heretofore, to obtain accurate data for each of the sensed parameters, it has been considered necessary to provide separate modulating circuits for each of the meteorological parameter sensors. This has tended to increase the cost, complexity and power supply drain of the radiosonde circuitry. The latter apsect is particularly significant in an airborne meteorological sensing apparatus in which the weight of the power sources, e.g., batteries or power cells. is preferably kept at a minimum consistent with the power requirements of the system.

It is therefore an object of the invention to provide an improved data generating circuit having particular use in a meteorological parameter data sensing and transmitting system.

It is a further object of the invention to provide a circuit of the type described in which the harmonic content of the data pulses is reduced, thereby reducing the possible interference between the data and navigation signals.

It is still a further object of the invention to provide in a meteorological telemetry system, a data signal generating circuit in which the sensed meteorological data energy is compressed into a relatively narrow, lower frequency spectrum, to thereby minimize or completely prevent harmful interference between the transmitted data and navigation signals.

It is another object of the invention to provide a data modulating circuit of the type described in which two independent parameters can modulate a single data pulse train.

It is yet a further object of the invention to provide a circuit of the type described having greater flexibility of use in a meteorological telemetry apparatus.

To these ends, the data signal generating circuit of the invention comprises a variable frequency pulse oscillator capable of producing a series of relatively narrow width pulses at a rate determined by the value of an electrical parameter, e.g., resistance, which in turn is determined by the level of a sensed parameter, e.g., temperature. The pulse output of the pulse oscillator is coupled to a pulse stretching circuit which increases the width of the oscillator pulses to thereby reduce the harmonic content of those pulses, particularly at the high frequency end of the spectrum.

In another aspect of the invention, the extent to which the pulse stretcher or expander operates on the variable frequency oscillator output pulse is controlled by an external signal applied to a selected component of the former circuit. If desired, the control signal may be obtained from an independently sensed second parameter, e.g., humidity or pressure, to thereby modulate the already frequency-modulated pulse train a second time in response to a second sensed parameter. Also disclosed is a novel pulse stretching circuit which can be used to advantage in the data signal producing circuit of the invention.

Figure 2:
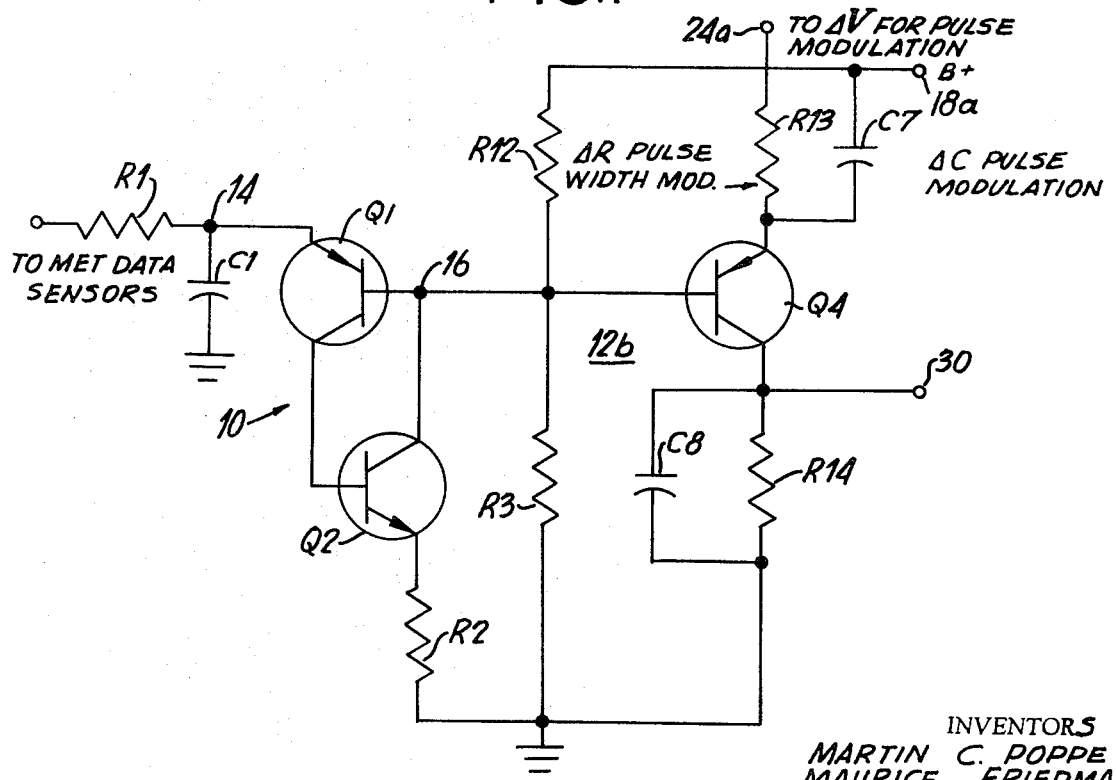

To the accomplishment of the above and to such further objects as may hereinafter appear, the present invention relates to a meteorological data oscillator and pulse stretcher, substantially as defined in the appended claims and as described in the following specification taken together with the accompanying drawing in which:

FIG. 1 is a schematic diagram of the circuit of the invention in accordance with one embodiment thereof; and FIG. 2 is a schematic diagram of a second embodiment of the invention in which an alternative pulse stretcher circuit is utilized.

The circuits shown in FIGS. 1 and 2 each comprise a variable frequency pulse generator or oscillator having an output coupled to a pulse stretcher circuit. The two circuits illustrated employ basically the same pulse oscillator which is therefore identified by reference numeral 10 in both embodiments. The pulse stretcher circuits are different in the two disclosed circuits and are thus identified by numeral 12a in FIG. 1 and 12b in FIG. 2.

Pulse oscillator 10 produces a pulse train having a repetition rate determined by the value of a selected electrical parameter of a data sensor such as the resistance of a temperature-sensitive thermistor. The data sensor, which is now shown in the drawing, is connected in the embodiment of FIG. 1 through a resistor R1 to a junction point 14. A capacitor C1 is connected between point 14 and ground, and point 14 is connected to the emitter of a PNP transistor Q1. The collector of transistor Q1 is connected to the base of a NPN transistor Q2, the emitter of which is connected to ground through a resistor R2. The collector of transistor Q2 is connected to the base of transistor Q1 at a junction point 16 which defines the output terminal of the variable pulse oscillator. A resistor R3 is connected between point 16 and ground.

Pulse stretcher circuit 12a is connected to oscillator 10 at point 16 and includes a resistive voltage divider consisting of resistors R4 and R5 connected between a B+ source at 18 and ground and defining a junction point 20 at their point of connection. Point 20 is coupled through a capacitor C2 and a diode D to the base of an NPN transistor Q3.

A resistor R6 is connected between a point 22 defined at the connection of capacitor C2 and the cathode of diode D and ground, and a capacitor C3 is connected between the emitter of transistor Q3 and ground. Resistors R7 and R8 are respectively connected between the B+ source 18 and the base and collector of transistor Q3. The emitter of transistor Q3 is connected directly to ground. A resistor R9 is connected between the anode of diode D and a source of a modulating voltage 24 for reasons to be explained below.

The output of the pulse stretcher circuit is derived at output terminal 26 from the collector of transistor Q3 through an output network comprising series-connected resistors R10 and R11 and capacitor C4. To complete the description of the circuit of FIG. 1, a high-frequency a.c. bypass capacitor C5 is connected between the input end of resistor R1 and ground, and a capacitor C6 having a similar function is connected between the junction point 28 of resistors R10 and R11 and ground.

In operation, the current flow through resistor R1 is proportional to the magnitude of a sensor voltage source (not shown) and the meteorological data sensor impedance coupled to that voltage source. That current, which thus accurately reflects the value of the meteorological parameter being sensed, varies the rate at which capacitor C1 charges, it being assumed that the voltage on that capacitor is initially 0 volts.

Capacitor C2 continues to charge toward the value of the sensor voltage source until the initially reverse-biased emitter-base junction of transistor Q1 becomes forward biased and thus conductive, causing collector current to flow in that transistor. That collector current is applied to the base of transistor Q2 causing transistor Q2 to become conductive. The transistor Q2 base current is amplified by the beta of that transistor and the thus amplified current at the collector of transistor Q2 is coupled back to the base of transistor Q1 causing a rapid saturation of both transistors Q1 and Q2, which in turn causes the emitter-base junction of the former to be turned on hard.

When transistor Q1 is in the hard conductive state the stored voltage on capacitor C1 then rapidly discharges through the conducting paths of transistors Q1 and Q2 and resistors R2 and R3 towards a voltage near 0 volts. At the time the voltage on capacitor C1 has discharged to a sufficiently low voltage such that the current flow into the emitter of transistor Q1 is no longer able to maintain transistors Q1 and Q2 in the saturated state, the emitter-base junction of transistor Q1 returns to its initial high impedance state at which time transistor Q1 is once again nonconductive. Capacitor C1 at this time returns to its initial discharged state in preparation for the next charge discharge cycle.

During the relatively brief period of saturation of the transistors a narrow negative pulse is produced at terminal 16. The rate at which transistor Q1 is turned on, that is, the rate at which output pulses appear at terminal 16, is directly proportional to the charging rate of capacitor C1, and is thus proportional to the value of the data sensor impedance and the magnitude of the sensed meteorological parameter, as is desired.

In summary, the rate of the output pulse produced by pulse oscillator 10 is a function of the sensed meteorological parameter. The pulse rate-sensor impedance relationship may be adjusted over the anticipated values of the sensor impedance by varying the value of resistor R1 to adjust the high frequency response, and the value of resistor R3 to vary the middle frequency response of the variable frequency pulse oscillator.

The output pulse of oscillator 10 is coupled to the input of the pulse stretcher 12a which thereupon produces at its output terminal 26 a chain of pulses of increased duration or width at the rate determined by oscillator 10. Transistor Q3 of pulse stretcher 12a is normally biased in the on condition and a voltage of about 0.7 volts, corresponding to the emitter-base voltage drop of that transistor, is present on capacitor C3. Diode D is normally reverse biased by the voltage supplied at point 20 by the resistance voltage divider. When a negative pulse appears at terminal 16 as described above, diode D is forward biased and conducts causing the charge from capacitor C3 to be transferred to capacitor C2.

When the negative pulse at terminal 16 is removed upon the discharge of capacitor C1, diode D is again reverse-biased and non-conductive closing the discharge path for capacitor C3 leaving a reduced charge, e.g., less than 0.7 volts on the latter capacitor. At this time the charge on capacitor C2 begins to bleed off through resistor R6, and capacitor C3 is respectively recharged through resistors R7 and R9 to the source voltage and modulation voltage.

During the period that capacitor C3 is recharging current is bypassed from the base of transistor Q3 causing that transistor to become non-conductive. Transistor Q3 once turned off in this manner continues to remain non-conductive until the voltage on capacitor C3 reaches a level exceeding the base-to-emitter breakdown voltage of transistor Q3, at which time that transistor is once again turned on and the voltage on its collector returns to its initial state.

In this manner, a pulse is produced at the collector terminal 28 of the pulse stretcher circuit having a width or duration corresponding to the period during which transistor Q3 is in the non-conductive state in response to the negative output pulse produced by oscillator 10. That period is in turn determined by the rate at which capacitor C3 recharges to a level sufficient to exceed the emitter-base breakdown voltage of transistor Q3 as described above.

It will thus be appreciated that by either varying the value of resistor R9, the level of the modulating voltage applied to that resistor, or the value of capacitor C3, or by performing any combination of these steps, the rate at which capacitor C3 discharges and thus the "off" period of transistor Q3 and the duration of the output pulse can be controlled.

In another aspect of this invention any one or more of these pulse-width varying steps may be performed in response to the sensing of a second variable meteorological parameter different than that meteorological parameter whose value controls the pulse rate output of oscillator 10. The second parameter sensing can be utilized in this manner to further modulate the output of the pulse oscillator to thereby generate a pulse train that is modulated in two respects, to wit, frequency and pulse width, in response to two independent inputs. That twice-modulated single pulse train may thus be utilized to convey information on two independently sensed parameters to increase the usefulness of the system without any significant increase in circuit complexity.

In a practical system, the resistance of resistor R7 may be that of a data sensor that varies in response to variations in the second sensed parameter, and the modulating voltage may be the voltage drop across a similar variable resistance. Capacitor C3 may be a voltage-variable capacitance diode having a value of capacitance determined by the magnitude of a voltage connected across its terminals. That voltage may be obtained in a manner similar to the derivation of the variable modulating voltage at 24. If desired, the width of the output pulse from pulse stretcher 12a may also be controlled by a manual adjustment of any one of the three variable circuit parameters described above, rather than in response to a second sensed meteorological parameter.

The output network of pulse stretcher 12a consisting of resistors R10 and R11 and capacitor C4 removes the high frequency components from the pulse stretcher output pulse to thereby further prevent interference with the navigation modulation signal, which is summed with the meteorological data signals in the radiosonde translator modulating circuit.

The embodiment of the invention illustrated in FIG. 2 utilizes substantially the same variable frequency oscillator as that employed in the embodiment of FIG. 1, and will thus not be further described herein. Components of the oscillator in FIG. 2 are identified by reference numerals corresponding to those used in FIG. 1.

In FIG. 2 the pulse stretcher 12b comprises a PNP transistor Q4 having a base connected to output terminal 16 of the pulse oscillator. A resistor R12 is connected between the B+ voltage source 18a and the base of transistor Q4, and a capacitor C7 is connected between source 18a and the emitter of that transistor.

The emitter of transistor Q4 is also connected through a resistor R13 to a modulating voltage source 24a, and its collector is coupled through a network consisting of parallel-connected resistor R14 and capacitor C8 to ground. The output of pulse stretcher 12b is taken at the collector of transistor Q3 at an output terminal 30.

Unlike conventional designs of transistor circuits in which the collector resistance is lower than the emitter resistance, in the embodiment of FIG. 2, this normal arrangement is reversed in that the collector resistance is higher than the emitter resistance for reasons to be further explained below, and may be set at a value twice that of the emitter resistance. That is, resistor R14 has twice the value of resistance as resistor R13.

The voltage divider of resistors R3 and R12 produces a normal voltage of 3 volts at the base of transistor Q4 and that transistor thus tends to be normally heavily conductive and saturated. That is, the emitter of transistor tends to go toward approximately 3.7 volts. Current flowing in the collector resistor R14 would tend to equal the current flowing in the emitter transistor R13, less the normally small base current. However, since resistor R14 is twice the value of resistor R13, the resulting voltage drops across these two resistors would exceed the voltage source level of +6 volts, which is an impermissible condition.

As a result, some of the emitter current tends to be diverted through the base of transistor Q4 thus lowering the collector current and reducing the voltage drop across collector resistor R14 to a level approximately equal to that across emitter resistor R13. There is also a slight drop in the base voltage, and transistor Q4 thus normally operates in its conducting state but at less than a saturated condition.

At this time, one plate of capacitor C7 is at the B+ supply level and its other plate is at the emitter voltage across resistor R13 of slightly above 3 volts, with a resulting normal charge of slightly less than 3 volts being developed across that capacitor.

When a negative pulse is produced at the base of transistor Q1 of pulse oscillator 10, the base of transistor Q4 is driven toward ground, and transistor Q4 is thereby driven harder into saturation. At this time, the emitter of transistor Q4 tends to follow the base of that transistor toward ground and, because of the relative magnitudes of the emitter and collector resistors, the collector voltage also begins to decrease toward ground at a relatively gradual rate. Since the emitter voltage is less than 1 volt at this time, the charge on capacitor C7 increases to a level of above 5 volts.

When the relatively narrow negative pulse at the base of transistor Q4 disappears, that is, when the collector of transistor Q2 returns to its quiescent value, the base of transistor Q4 returns to a level of about 3 volts, and the increased charge on capacitor C5 causes the emitter of transistor Q4 to be more negative than its base, thereby causing that transistor to turn off. When this occurs, the collector voltage which is already near ground in response to the appearance of the oscillator pulse, decreases still further to nearly ground.

Since the emitter-base path of transistor Q4 is closed at this juncture, capacitor C7 now begins to discharge to the modulating voltage level through emitter resistor R13. Transistor Q4 remains in the off condition and the collector voltage remains at ground until the voltage on capacitor C7 and thus at the emitter of transistor Q4 decreases to a level sufficiently low to cause that transistor to be once again conductive. At this time the voltage at the collector of transistor Q4 rises towards about 3 volts and the normal conductive state of the transistor is resumed until the appearance of the next oscillator pulse.

The voltage at the collector Q4 is thus gradually turned low upon the appearance of the oscillator pulse and remains low until the charge on capacitor C7 is sufficiently reduced to turn on transistor Q3, then in the off state in response to the oscillator pulse. The period during which the collector voltage is low represents the duration of the expanded pulse at terminal 30 produced by pulse stretcher 12b in response to the narrow oscillator data pulse. As in the embodiment of FIG. 1, that duration can be adjusted by varying one or both of the magnitudes of capacitor C7 and resistor R13, and-/or the level of the control or modulating voltage. As a result, any of these parameters may be utilized to modulate the pulse width of the data pulse as a function of time, to thereby present a second level of data to the thus modulated pulse train. The capacitor C8 across the collector resistor R14 further shapes the expanded output pulse by removing some of the high frequency components from that pulse.

The pulse oscillator-pulse stretcher of the present invention thus provides a pulse output at a rate corresponding to the amplitude of a sensed parameter such as a signal representative of temperature, humidity, pressure, or the like. The frequency-modulated pulse train is shaped by means of a pulse shaper coupled to the oscillator output to remove the high frequency components of the pulses and thereby reduce the possibility of interference between the data and navigations signals typically transmitted over a common carrier in a meteorological telemetry system.

Moreover, the amount of pulse expansion can be controlled in response to a second independently sensed parameter to thereby greatly expand the flexibility and utility of the circuit by providing data on both sensed parameters on a single pulse train. In addition, since the stretching of the data pulse concentrates the data signal into a relatively low frequency range, the band pass of the receiver filter can be significantly reduced, thereby greatly reducing the amount of received telemetry noise.

While several embodiments of the invention have been herein specifically described, it will be apparent that modification can be made therein without departing from the spirit and scope of the invention.

We claim:

1. A data signal generator comprising pulse generating means including first and second transistors each having a base, an emitter, and a collector, the collectors of said first and second transistors being coupled respective to the bases of said second and first transistors, means including first charging means coupled to the emitter of said first transistor and charged at a rate proportional to the value of a first sensed parameter coupled to the input of said pulse generating means for varying the rate at which pulses are produced by said pulse generating means in accordance with the magnitude of said first sensed parameter, a voltage source coupled to the base of said first transistor, and means coupled to the output of said pulse generating means for expanding the width of the pulses produced by said pulse generating means in accordance with the magnitude of a second sensed parameter, said pulse expanding means including a third transistor having a base coupled to the base of said first transistor, an emitter, and a collector, and second charging means being charged at a rate proportional to the magnitude of said second sensed parameter and coupled to the emitter of said third transistor.

2. The data signal generator of claim 1, further comprising means coupled to said pulse expanding means for controlling the degree of pulse width expansion produced by said pulse expanding means.

3. The data signal generator of Claim 1, in which said pulse expanding means further comprises first and second resistance means coupled respectively to the emitter and collector of said third transistor, said second resistance means having a value greater than that of said first resistance means.

4. The data signal generator of claim 2, in which said second charging means comprises series-connected resistance and capacitance means coupled to a source of a charging voltage, said pulse width controlling means comprising means for varying the value of one of said resistance and capacitance means and said charging voltage.

5. A meteorological data modulator comprising a variable frequency pulse oscillator adapted to be coupled to a meteorological data sensing element having an electrical parameter proportional to a first sensed meteorological parameter, said pulse oscillator generating a series of pulses at a frequency proportional to the magnitude of said electrical parameter and including first and second transistors, each having a base, an emitter, and a collector, the bases of said first and second transistors being respectively coupled to the collectors of said second and first transistors, and first charging means coupled to said data sensing element and to the emitter of said first transistor and charged at a rate corresponding to the magnitude of said first meteorological parameter, a voltage source coupled to the base of said first transistor, and means coupled to the output of said pulse oscillator for expanding the width of said pulses generated by said pulse oscillator according to the magnitude of a second sensed meteorological parameter, said pulse width expanding means including a third transistor having a base coupled to the base of said first transistor, and second charging means coupled to the emitter of said third transistor and charged at a rate corresponding to the value of said second sensed meteorological parameter.

6. The data signal generator of claim 5, further comprising means coupled to said pulse expanding means for controlling the degree of pulse width expansion produced by said pulse expanding means.

7. The data signal generator of claim 6, in which said pulse width controlling means comprises means for varying the discharge rate of said second charging means.

8. The data signal generator of claim 7, in which said second charging means comprises series-connected resistance and capacitance means coupled to a source of a charging voltage, said pulse width controlling means comprising means for varying the amplitude of one of said resistance and capacitance means and said charging voltage.

* * * * *